United States Patent Office 3,697,469
Patented Oct. 10, 1972

3,697,469
METHOD FOR EMULSION POLYMERIZATION OF ORGANOSILOXANES
Masanobu Ikoma, Gunma-ken, Japan, assignor to Shinetsu Chemical Company, Tokyo, Japan
No Drawing. Filed Mar. 27, 1969, Ser. No. 811,229
Claims priority, application Japan, Apr. 9, 1968, 43/23,533
Int. Cl. C08g 31/34
U.S. Cl. 260—29.2 M    12 Claims

ABSTRACT OF THE DISCLOSURE

When organosiloxane represented by the unit formula $$R_a SiO_{\frac{4-a}{2}}$$

where

R is a hydrogen atom or a monovalent hydrocarbon radical or a substituted monovalent hydrocarbon radical, and $a$ has an average value of from 1 to 3 is emulsified in water containing a salt-type or salt form of an anionic surface active agent, and then brought into contact with an acid type cationic exchange resin, said anionic surface active agent is subjected to ion exchange and turns from salt type into acid type, thereby starting the polymerization of the organosiloxane. Therefore, by this method, not only the arrangement and control of the reaction condition are made easier, but also the polymerization reaction is made to proceed uniformly, enabling the preparation of stable organopolysiloxane emulsions.

SUMMARY OF THE INVENTION

This invention relates to a method for emulsion polymerization of organosiloxanes. For preparing a stable emulsion of high molecular weight organopolysiloxane, a method for emulsion polymerization of organosiloxane in an aqueous medium in the presence of a catalyst of a strong mineral acid or a strong alkali (Canadian Pat. No. 559,237) is known. But the catalyst employed in this case is a strong mineral acid or a strong alkali, so that the inorganic salt formed by the neutralization of such a catalyst, after the completion of polymerization, is apt to deteriorate the properties of the emulsion prepared, and reduce the stability thereof, and what is worse, it is not easy to remove this salt from the emulsion.

On the other hand, the use of alkylbenzene sulfonic acid, alkylnaphthalene sulfonic acid, aliphatic sulfonic acid, silylalkyl sulfonic acid, alkyl diphenyl ether sulfonic acid or alkylhydrogen sulfate in emulsion polymerization of organosiloxane has been proposed in the specifications of British Pat. No. 1,024,024, Belgian Pat. No. 686,812, or U.S. Pat. No. 3,360,491, according to which the sulfonic acid compounds function both as emulsifier and as polymerizing catalyst, so that the polysiloxane emulsion prepared will be more stable. But the sulfonic acid compounds mentioned above are all unstable and are easily decomposed, therefore they are apt to lose their catalytic power during storage. Moreover, their use is apt to color the emulsion prepared, and to corrode, with their strong acidity, the apparatus employed in the preparation of the emulsion. Furthermore, the compounds themselves are polymerizing catalysts as well as emulsifiers, so that the polymerization of the organosiloxane starts with the emulsification thereof, consequently the methods of these inventions have a disadvantage in that it is difficult to arrange or control the reaction conditions or to have the reaction proceed uniformly.

It is an object of the present invention to provide a new method for uniformly carrying out polymerization of organosiloxanes in which the arrangement and control of the polymerizing reaction conditions can be conducted with ease. Another object is to provide a method for emulsion polymerization of organosiloxanes free from the disadvantage of coloring the product, and wherein the deterioration of the polymerizing power of the catalyst and the corrosion of the emulsifying apparatus are successfully prevented. A further object is to use by choice a proper salt-type anionic surface active agent as an agent for promoting emulsification and polymerization, thereby preparing organopolysiloxane emulsions having the desired properties.

The object of the present invention is attained by (i) emulsifying, in water containing a salt-type anionic surface active agent, an organosiloxane having the unit formula $$R_a SiO_{\frac{4-a}{2}}$$

where

R is a hydrogen atom or a monovalent hydrocarbon radical or a substituted monovalent hydrocarbon radical, and $a$ has an average value of from 1 to 3 and then (ii) contacting said emulsion with an acid-type cationic exchange resin so that said surface active agent may be ion-exchanged from salt type into acid type, thereby acquiring catalytic power and at the same time starting the polymerization of said organosiloxane by making said emulsion an acid medium with a pH value of less than 4.

In practicing the method of the invention, first a stable organosiloxane emulsion of desired concentration is prepared by the action of a salt of an anionic surface active agent, and subsequently, said surface active agent is ion-exchanged from salt type into acid type, either by adding, to the emulsion, the cationic exchange resin or by letting the emulsion pass through the layer of a cationic exchange resin, thereby imparting catalytic properties to the surface active agent. Consequently the method possesses the advantage of making it possible not only to control the polymerization condition with ease, but also to have the polymerization reaction proceed quite uniformly all over the emulsion surface. Furthermore, the anionic surface active agent employed in the method of the invention is selected at will from commercially available anionic surface active agents, so that the emulsions of desired properties can be easily prepared, and the corrosion of the polymerizing apparatus likely to be brought about by other methods can be completely prevented.

As mentioned before, the organosiloxanes employed in practicing the method of the invention have the unit formula,

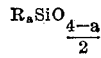

where

R is a hydrogen atom or a monovalent hydrocarbon radical or a substituted monovalent hydrocarbon radical, and $a$ has an average value of from 1 to 3, in which R is exemplified by (i) a monovalent hydrocarbon radical selected from the group consisting of alkyl groups such as methyl, ethyl and propyl, alkenyl groups such as vinyl and allyl, cycloaliphatic groups such as cyclobutyl and cyclopentenyl, aryl groups such as phenyl and naphthyl, alkaryl groups such as tolyl, aralkyl groups such as benzyl and diphenyl methyl, or (ii) a halogen-substituted monovalent hydrocarbon radical such as chlorophenyl and 3.3.3 trifluoropropyl. R may be a hydrogen atom as mentioned above and in that case, it is preferable that on the average at the most one hydrogen atom is present per silicon atom. Said siloxanes are used either singly or as a mixture of two or more kinds.

These siloxanes are usually prepared by the hydrolysis or cohydrolysis of corresponding organosilane or silanes, but if circumstances require, they may be prepared by adding to water some hydrolyzable silanes, such as alkoxy silane, and dispersing them as they are.

On the other hand, the salt-type anionic surface active agent used in preparing said organosiloxane emulsions must be one that can emulsify the organosiloxane and at the same time, when in contact with the cationic exchange resin, is turned from the salt type into corresponding acid type by ion exchange, thereby being imparted with catalytic power, and capable of preparing an acid emulsion with a pH value of less than 4. This type of surface active agent may be selected from the group consisting of (i) an alkali metal salt or ammonium salt of sulfuric acid esters such as of straight-chain aliphatic alcohol sulfuric acid ester, of branched-chain aliphatic alcohol sulfuric acid ester, of alkyl polyether sulfuric acid ester, of alkyl-aryl polyether sulfuric acid ester, of fatty oils sulfuric acid esters, of olefins sulfuric acid esters and of fatty acid amide sulfuric acid ester, and (ii) an alkali metal salt or ammonium salt of sulfonic acid, such as paraffin sulfonate, fatty acid amide sulfonate, alkylbenzene sulfonate, alkyldiphenylether sulfonate, formaldehyde condensation product of alkyl naphthalene sulfonate, dialkyl ester of succinic acid sulfonate, dialkyl ester of phthalic acid sulfonate, alkylarylpolyether sulfonate and alkylbenzimidazole sulfonate. The selection of the anionic surface active agent should be made in consideration of the properties desired of the finished organopolysiloxane emulsion, such as wettability, penetrating property, emulsification, and foaming, defoaming, softening, cleansing, water-proofing, water-repelling and anti-corrosive powers. If necessary, a mixture of two or more of the surface active agents given above may be employed, or a single or mixed surface active agents may be used with an addition of various kinds of nonionic, cationic, or ampholytic surface active agents.

The organosiloxane emulsions may be of any concentrations, as so long as the emulsions formed stay stable, but usually they are in the range of from 5 to 60% of the total weight of said emulsion. The quantity of anionic surface active agent employed for the emulsification of the organosiloxane is usually above 0.05% of the total weight of said organosiloxane, or preferably, it may range from 0.2 to 5 weight percent, which is desired for maintaining, the emulsion prepared by the use of said surface active agent in a stable state and for keeping the emulsion subjected to ion-exchange, at a pH of less than 4 or preferably at less than 2.5.

If the cationic exchange resin is added to the stable emulsion of the organosiloxane prepared as described above, or if the organosiloxane emulsion is passed through a layer of the cationic exchange resin, the ion-exchange resin rapidly exchanges ions with the above-mentioned anionic surface active agent which is present on the surface of the emulsion in the form of salt, and turns it into a surface active agent of corresponding acid type, so that said surface active agent functions as a catalyst as well as an emulsifier, thereby starting the polymerization of organosiloxane in the system, giving the desired polymer emulsion.

Said polymerization proceeds when the system, after contacting with the cationic exchange resin, is kept at a temperature of from 15 to 90° C., while it is allowed to stand still or stirred as the case may be. If the occasion demands, other polymerizing catalysts may also be employed in addition.

Any commercially available cationic exchange resin may be employed for the purpose, but it is preferable to choose such a cationic exchange resin of acid type which has ion exchange radicals attached to its structure, e.g., a cationic exchange resin having strong acidic sulfonic radicals, or preferably a cationic exchange resin of MR (macroreticular) type, having in it a large network structure, because in comparison with ordinary gel-type ion exchange resins, the ion-exchange resin of MR type exhibits smaller expansion or contraction, and its mechanical strength is greater, so that it can be handled as a dry resin. Moreover, it is completely globular, and is excellent in its solvent resistance, pollution resistance and heat resistance, so that after the ion-exchange is completed, the emulsion attached to the resin can be easily washed off with water or solvent. Consequently, the regeneration of the resin can be carried out with ease by employing the solution of hydrochloric acid. The quantity of the cationic exchange resin used for the purpose may be decided depending upon the desired polymerization degree of the polymer, and the expected polymerization velocity. But in order to accelerate the polymerization reaction, it is preferable that the quantity of the cation exchange resin is at least the chemical equivalent of the surface active agent. If it is smaller than the chemical equivalent, any part of the surface active agent which has not been ion exchanged acts not as a polymerizing catalyst but merely as an emulsifier, making it difficult for the emulsion to maintain its acid condition, especially to maintain its pH value at the desired level, with the result that the reaction velocity is decresed.

The organopolysiloxane-containing emulsion thus prepared consists of extremely fine particles, therefore it is exceedingly stable. But the emulsion is acidified at the termination of polymerization, so that it should be neutralized with some alkaline substance before it is put to practical use. The alkaline substance may be selected from the group consisting of caustic soda, caustic potash, sodium carbonate, potassium carbonate and aqueous ammonia.

The organopolysiloxane emulsions prepared by the method of the invention can be used as a softening agent, an abrasion-reducing agent or a lubricant for natural fibers, synthetic fibers and glass fibers, or as a releasing agent for plastics, rubber, paper or shell molds, or as a polishing agent for wood, metals and hair, or further, as a modifier for natural or synthetic rubber latices. It may also be used as a defoaming agent, or as a component of emulsified paints.

When colloidal silica sol, having a particle diameter of from 1 to 7 m$\mu$, is added, in an amount of from 5 to 20 weight parts in terms of silica, to 100 parts of said organopolysiloxane emulsion, and water is evaporated from it, a rubbery film provided with excellent toughness and elasticity is obtained. Consequently, the emulsion mixed with such colloidal silica sol is suited for treating the surface of the articles of rubber, paper or fibers.

The invention will now be described by several examples, in which the viscosity is that of organopolysiloxane itself, although when the value of the viscosity is particularly high, it is given by the specific viscosity as follows:

$$\eta = \eta_1/\eta_2$$

(where $\eta_1$ is the value of the viscosity measured at 25° C. of a solution prepared by dissolving 1 g. of said organopolysiloxane in 10.0 cc. of toluene, and $\eta_2$ is the viscosity of toluene measured at 25° C.).

The pH value of the emulsion was measured by means of a pH meter equipped with glass electrodes, on condition that the pH value at 25° C. of the aqueous solution of $KH_3(C_2H_4)_4 2H_2O$ is 1.68. The properties of the ion exchange resins employed in the examples were as given in Table 1.

TABLE 1

| Trade name | Maker | Type | Exchange radical | Surface area, m.²/g. dry resin | Average pore diameter, A. | Total exchange capacity | |
|---|---|---|---|---|---|---|---|
| | | | | | | Mg. equivalent/g. dry resin | Ml. equivalent/ml. wet resin |
| Amberlite 200 | Rohm & Haas | MR | —SO$_3$H | 42.5 | 298 | 4.3 | 1.75 |
| Amberlyst 15 | do | MR | —SO$_3$H | 40–50 | 290 | 4.5–4.7 | 1.66 |

The amounts of the substances mentioned in the examples are all in parts by weight or in percent by weight.

EXAMPLE 1

A mixture of 350 parts of octamethyl cyclotetrasiloxane, 5 parts of sodium lauryl sulfate (anionic surface active agent), and 645 parts of water, was homogenized by passing it through a Gaulin homogenizer under the pressure of 316 kg./cm.² (4,500 p.s.i.). To the emulsion thus prepared were added 5 parts of acid-type cationic exchange resin (Amberlyst 15) and while keeping the pH value of the reaction medium at 1.2, the emulsion was heated at 70° C. for 7 hours, while it was stirred slowly so that the reaction might proceed within that time, and subsequently, the reaction product was filtered and allowed to stand for 40 hours at 25° C., yielding an emulsion of dimethyl polysiloxane. In the course of the polymerization reaction, the emulsion was sampled several times, and the samples thus collected were neutralized with potassium carbonate, and then broken with ethyl alcohol. The viscosities of the siloxane components and the quantities of the unpolymerized components of the samples were as given in Table 2.

TABLE 2

| Lapse of time after the start of the polymerization reaction (hrs.) | Viscosity of polysiloxane (cs.) | Unpolymerized components (percent) |
|---|---|---|
| 3.5 | 760 | 25.2 |
| 7 | 22,400 | 14.0 |
| 37 | $\eta$=1.89 | 13.6 |

The emulsion obtained by the present polymerization was an extremely stable emulsion, consisting of fine particles of less than 1$\mu$, which exhibited excellent releasing effect when employed on shell molds.

EXAMPLE 2

An emulsion was prepared of a mixture of 327.7 parts of octamethyl cyclotetrasiloxane, 22.3 parts of phenyl triethoxysilane, 10 parts of sodium lauryl polyethenoxy sulfate (anionic surface active agent, Trax K5, Nippon Oils and Fats Co., Ltd.) and 640 parts of water, as in Example 1, and to the emulsion were added 20 parts of Amberlyst 15 as also described in Example 1, after the pH was lowered to 1.5 with slow stirring for 5 minutes, the emulsion was allowed to stand for 8 hours at 70° C., yielding an emulsion containing polysiloxane whose polymer yield was 97.2%.

The emulsion obtained was maintained at room temperature for another 24 hours, and after the ion exchange resin was removed by filtration, it was neutralized with 28% aqueous ammonia. The product obtained proved to be a very good painting material for urea melamine resin decorated boards and substrata of glass, wood, metals, such as iron and aluminum, and synthetic resins, such as polyvinyl chloride, because of its affinity for these materials. A mixture obtained by adding 0.5 part of 50% dibutyl tin octoate emulsion to 100 parts of this emulsion was particularly suitable for treating glass fibers, and a 1 mm. thick sheet prepared of a mixture of 50 parts of a 10% sol of fine silica particles, 0.5 part of 50% emulsion of dibutyl tin octoate and 100 parts of this emulsion exhibited rubbery elasticity with its Shore hardness of 43, tensile strength of 31 kg./cm.² and elongation of 240%.

EXAMPLE 3

A mixture of 350 parts of octamethyl cyclotetrasiloxane, 0.5 part of hexamethyl disiloxane, 4 parts of di-(2-ethyl hexyl) ester of sodium sulfosuccinic acid (anionic surface active agent) and 645.5 parts of water was stirred for 5 minutes in a homogenizer, yielding an emulsion, which was then passed through a 50 cm. thick layer packed with 10 parts of wet Amberlyst 15 (water contents: 50%), so that ion exchange might take place between said active agent and the Amberlite. The pH value of the emulsion which had been 6.6 before the ion-exchange became 1.6 by this reaction. Subsequently, the emulsion was allowed to stand at room temperature for 100 hours, during which time polymerization proceeded, giving an emulsion of polysiloxane. The relation among the polymerization time, the viscosity of the polysiloxane and the amount of the unpolymerized component was as shown in Table 3.

TABLE 3

| Lapse of time after the start of polymerization reaction (hrs.) | Viscosity of polysiloxane (cs.) | Unpolymerized components (percent) |
|---|---|---|
| 10 | 450 | 51.2 |
| 20 | 43,000 | 22.4 |
| 30 | 98,500 | 11.2 |
| 50 | 98,500 | 11.1 |

The finished emulsion, obtained by neutralizing this emulsion was suitable as an abrasion-reducing agent as well as an excellent lubricant for textiles, with its superior stability and penetrating property.

EXAMPLES 4–18

To 350 parts of octamethyl cyclotetrasiloxane and 640 parts of water, 7 parts of anionic surface active agent were added selected from the group consisting of various kinds as listed in Table 4, and the mixture was homogenized by passing it through a Gaulin homogenizer under the pressure of 279 kg./cm.² (4000 p.s.i.). Each emulsion prepared by adding a different kind of commercial anionic surface active agent was kept in a reactor, and with slow stirring, heated up to 70° C., when 10 parts of acid-type cationic exchange resin (Amberlite 200) was added to it to be reacted for 7 hours at that temperature. Subsequently the ion-exchange resin was removed by filtration, and the resulting emulsion was allowed to stand for another 20 hours at 25° C. When a part of the emulsion was collected and neutralized with sodium carbonate, the viscosity and polymer yield of the polysiloxane contained in it proved to be as shown in Table 4.

TABLE 4

| Example Number | Anionic surface active agents employed Component | Tradename | Maker | η | Observed value Polymer yield, percent | pH at the polymerization |
|---|---|---|---|---|---|---|
| 4 | Sodium fatty alcohol sulfate | Emal O | KaO | 1.88 | 86.8 | 1.4 |
| 5 | Sodium salt of sulfated olefin | AB 36 | D.K.[1] | 1.80 | 84.6 | 1.7 |
| 6 | Sodium salt of sulfated fatty oil | Antox CSF | NN [2] | 1.24 | 56.1 | 2.5 |
| 7 | Sodium alkyl polyether sulfate | Emal 20C | KaO | 1.62 | 78.0 | 1.6 |
| 8 | Sodium alkyl aryl polyether sulfate | Pelex TR | KaO | 1.35 | 60.9 | 1.4 |
| 9 | Sodium salt of sulfonated paraffin | Mevsolat H | Bayer | 1.92 | 87.0 | 1.3 |
| 10 | Sodium oleic acid amide sulfonate | Diapon T | NOF [3] | 1.45 | 82.5 | 1.9 |
| 11 | Sodium alkyl benzene sulfonate | Neogen R | D.K. | 1.86 | 85.0 | 1.4 |
| 12 | Sodium alkyl diphenyl ether disulfonate | Sandet BL | S.K.[4] | 1.85 | 87.0 | 1.7 |
| 13 | Condensation product of sodium alkylnaphthalen sulfonate | Demol N | KaO | 1.86 | 83.2 | 1.8 |
| 14 | Alkyl ester of sodium sulfosuccinic acid | Nikkol OT | N.C.[5] | 1.65 | 96.5 | 1.9 |
| 15 | Alkyl ester of sodium sulfophthalic acid | Rapisol FC | NOF | 1.70 | 85.0 | 1.6 |
| 16 | Sodium alkyl aryl polyether sulfonate | Newcol 861S | NN | 1.20 | 57.4 | 2.1 |
| 17 | Sodium salt of sulfonated alkyl benzimidazol | Ultrovon WJA | Ciba | 1.40 | 62.1 | 2.0 |
| 18 | Sodium diisobutyl oleic acid amide sulfonate | Humetol C | I.G. | 1.38 | 51.9 | 2.4 |

[1] Daiichi Kogyoseiyaku.
[2] Nippon Nyukazai.
[3] Nippon oils and fats.
[4] Sanyo Kasei.
[5] Nikko Chemical.

COMPARATIVE EXAMPLES 1–7

To 350 parts of octamethylcyclotetrasiloxane were added 636 parts of water and 14 parts of anionic surface active agent selected from the group listed in Table 5, and the mixture was emulsified by means of a Gaulin homogenizer. The emulsion thus prepared was mixed with 15 parts of Amberlite 200 and was stirred slowly at room temperature for 1 hour, thereby changing said surface active agent from the salt type into the acid type. The resultant emulsion was divided into two portions, and one was kept at room temperature for 120 hours, the other at 70° C. for 48 hours, so that a reaction might take place.

To each of the reactants obtained was added the chemical equivalent of isopropyl alcohol, thereby breaking the emulsion, and the polymer yield and the viscosity of the siloxane thus prepared were measured. No trace of polymerization was observed in any case, proving that such anionic surface active agents which would render the value of the pH of the emulsion above 4 would not serve the purpose of polymerizing organosiloxane.

TABLE 5

| Comparative Example No. | Surface reactant employed (component) | pH of emulsion to which was added the surface active agent |
|---|---|---|
| 1 | Sodium laurate | 5.4 |
| 2 | Potassium stearate | 5.4 |
| 3 | Potassium oleate | 5.2 |
| 4 | Sodium lauroyl salcocynate | 5.9 |
| 5 | Sodium lauryl phosphate | 4.6 |
| 6 | Ammonium lauryl phosphate | 4.2 |
| 7 | Ammonium nonylphenyl phosphate | 4.3 |

EXAMPLE 19

An emulsion prepared by homogenizing the mixture of (i) 270 parts of polysiloxane having a viscosity of 1,000 cs. consisting of 20 mol percent of diphenyl siloxane and 80 mol percent of dimethylsiloxane, (ii) 80 parts of octamethylcyclotetrasiloxane, (iii) 8 parts of di-(2-ethyl hexyl) ester of sodium sulfophthalic acid (anionic surface active agent), and (iv) 642 parts of water, was passed at room temperature through an ion-exchange column filled with wet Amberlite 200. The anionic surface active agent contained in the emulsion was ion-exchanged into a said active agent having acid-type catalytic power, with the pH value of the emulsion lowered to 1.6. The emulsion, when maintained at room temperature for 72 hours, had its viscosity raised above 50,000, and when neutralized with caustic soda, it proved to be a useful paintable release for metals and plastics.

EXAMPLE 20

An emulsion prepared by homogenizing the mixture of 175 parts of 3.3.3 trifluoropropylmethyl siloxane, 175 parts of octamethyl cyclotetrasiloxane, 60 parts of 10% aqueous solution of sodium aliphatic acid amide sulfonate (anionic surface active agent. Diapon S, Nippon Oils and Fats Co., Ltd.), and 590 parts of water, was ion-exchanged by the method of Example 19, and polymerized at 70° C. for 5 hours. The polysiloxane obtained had a viscosity of 5,200 cs. and its polymer yield was 84%. When neutralized with aqueous ammonia, the emulsion proved to be a superior water repellent for textile fabrics.

EXAMPLE 21

An emulsion prepared by mixing and homogenizing 70 parts of methyl hydrogen polysiloxane with its terminals closed with hydroxide radicals, and having a viscosity of 60 cs., 280 parts of octamethyl cyclotetrasiloxane, 7 parts of sodium lauryl polyethenoxy sulfate (anionic surface active agent, Trax K5, Nippon Oils and Fats Co. Ltd.), and 643 parts of water, was passed at room temperature through a wet layer filled with Amberlite 200, so that the anionic surface active agent contained in the emulsion would be turned into the acid type, thereby providing it with catalytic power. The time for which the emulsion was maintained in the ion exchange layer was 2.5 min., and the pH value of the emulsion after it passed through the layer was 1.4. The emulsion thus obtained was allowed to stand for 24 hours at room temperature and neutralized. The finished emulsion contained polysiloxane superior in elasticity. When the finished emulsion, with the addition of 0.1 part of zinc octoate and 0.1 part of dibutyltin octoate per 100 parts of the emulsion, was applied over a polyvinyl alcohol undercoat paper, it became hardened in 30 seconds at 180° C. The paper thus treated showed releasability of 10–15 g./½ inch, proving that the emulsion functions as an effective mold releasing agent.

EXAMPLE 22

15 parts of methyltriethoxysilane, 0.1 part of the surface active agent mentioned in Example 3, 2 parts of a mixture of polyoxyethylene nonylphenol ether and polyoxypropylene lauryl ether, which are nonionic surface active agents (NS210, Nikko Chemicals), and 83 parts of water, were mixed and emulsified, and then passed through a wet layer of Amberlite 200, yielding an emulsion of pH 3.5, which was allowed to stand for 10 hours and then neutralized with aqueous ammonia. The finished emulsion, containing powdery methylsilsesquioxane (polymer yield: 98%) with a particle diameter of 100–200 A., proved to be translucent and stable.

What is claimed is:

1. A method for emulsion polymerizing organosiloxane which is characterized by emulsifying, in water containing a salt form of an anionic surface active agent being at least one compound selected from the group consisting of an alkali metal salt of sulfuric acid esters, an ammonium salt of sulfuric acid esters, an alkali metal salt of sulfonic acid and an ammonium salt of sulfonic acid, an organosiloxane, having the unit formula

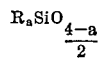

wherein R is selected from the group consisting of hydrogen atoms, monovalent hydrocarbon radicals and substituted monovalent hydrocarbon radicals, and $a$ has an average value of from 1 to 3, and contacting the resulting emulsion with an acid form of a cationic exchange resin having strong acidic sulfonic radicals, in a quantity which is at least the chemical equivalent of the anionic surface active agent in order to ion-exchange said surface active agent from the salt form into the acid form and at the same time lower the pH value of said emulsion below 4, thereby starting the polymerization of said organosiloxane.

2. The method of claim 1 wherein the quantity of said organosiloxane added is from 5 to 60% of the total weight of the finished emulsion.

3. The method of claim 1 wherein the quantity of the salt form of an anionic surface active agent added to organosiloxane is at least 0.05% of the total weight of said organosiloxane.

4. The method of claim 1 wherein the emulsion, consisting of the salt form of an anionic surface active agent and the organosiloxane, is contacted with the cationic exchange resin by adding said cationic exchange resin to the emulsion.

5. The method of claim 1 wherein the emulsion, consisting of the salt form of an anionic surface active agent and the organosiloxane, is contacted with the cationic exchange resin by passing said emulsion through a layer of the cationic exchange resin.

6. The method as claimed in claim 1, wherein said salt form of an anionic surface active agent is selected from the group consisting of an alkali metal or ammonium salt of straight-chain aliphatic alcohol sulfuric acid ester, branched-chain aliphatic alcohol sulfuric acid ester, alkyl polyether sulfuric acid ester, alkyl-aryl polyether sulfuric acid ester, fatty oils sulfuric acid ester, olefins sulfuric acid ester, fatty acid amide sulfuric acid ester, paraffin sulfonate, fatty acid amide sulfonate, alkylbenzene sulfonate, alkyldiphenylether sulfonate, dialkyl ester of succinic acid sulfonate, dialkyl ester of phthalic acid sulfonate, alkylaryl polyether sulfonate, and alkylbenzimidazole sulfonate, and the formaldehyde condensation product of an alkali metal or ammonium salt of alkyl naphthalene sulfonate, and the cationic exchange resin is of the macroreticular type.

7. A method for preparing an organopolysiloxane emulsion which is characterized by emulsifying, in water containing a salt form of an anionic surface active agent being at least one compound selected from the group consisting of an alkali metal salt of sulfuric acid esters, an ammonium salt of sulfuric acid esters, an alkali metal salt of sulfonic acid and an ammonium salt of sulfonic acid, an organosiloxane having the unit formula

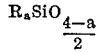

wherein R is selected from the group consisting of hydrogen atoms, monovalent hydrocarbon radicals and substituted monovalent hydrocarbon radicals, and $a$ has an average value of from 1 to 3, and contacting the resulting emulsion with an acid form of a cationic exchange resin having strong acidic sulfonic radicals in an amount which is at least the chemical equivalent of the anionic surface active agent, in order to ion-exchange said surface active agent from salt form into acid form, and at the same time lower the pH value of said emulsion below 2.5, thereby starting the emulsion-polymerization of said organosiloxane, and subsequently neutralizing the emulsion with alkaline substance.

8. The method of claim 7 wherein the polymerization is conducted at a temperature of from 15 to 90° C.

9. The method of claim 7 wherein the alkaline substance is selected from the group consisting of caustic soda, caustic potash, sodium carbonate, potassium carbonate and aqueous ammonia.

10. The method as claimed in claim 7, wherein said salt form of an anionic surface active agent is selected from the group consisting of an alkali metal or ammonium salt of straight-chain aliphatic alcohol sulfuric acid ester, branched-chain aliphatic alcohol sulfuric acid ester, alkyl polyether sulfuric acid ester, alkyl-aryl polyether sulfuric acid ester, fatty oils sulfuric acid ester, olefins sulfuric acid ester, fatty acid amide sulfuric acid ester, paraffin sulfonate, fatty acid amide sulfonate, alkylbenzene sulfonate, alkyldiphenylether sulfonate, dialkyl ester of succinic acid sulfonate, dialkyl ester of phthalic acid sulfonate, alkylaryl polyether sulfonate, and alkylbenzimidazole sulfonate, and the formaldehyde condensation product of an alkali metal or ammonium salt of alkyl naphthalene sulfonate, and the cationic exchange resin is of the macroreticular type.

11. A method for emulsion polymerizing organosiloxane which is characterized by emulsifying, in water containing a salt form of an anionic surface active agent being at least one compound selected from the group consisting of an alkali metal salt of sulfuric acid esters, an ammonium salt of sulfuric acid esters, an alkali metal salt of sulfonic acid and an ammonium salt of sulfonic acid, said organosiloxane, having the unit formula

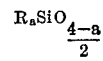

wherein R is selected from the group consisting of hydrogen atoms, monovalent hydrocarbon radicals and substituted monovalent hydrocarbon radicals, and $a$ has an average value of from 1 to 3, and adding to the resulting emulsion a macroreticular cationic exchange resin, having strong acidic sulfonic radicals in an amount which is at least the chemical equivalent of the anionic surface active agent, in order to ion-exchange said surface active agent from salt form into acid form, and at the same time lower the pH value of said emulsion below 2.5, thereby starting the emulsion polymerization of said organosiloxane, subsequently removing by filtration said macroreticular cationic exchange resin from the resulting organopolysiloxane emulsion, neutralizing the finished emulsion with alkaline substance and at the same time water-washing the macroreticular cationic exchange resin, and regenerating the cationic exchange resin with hydrochloric acid solution so that it may be re-used.

12. The method as claimed in claim 11, wherein said salt form of an anionic surface active agent is selected from the group consisting of an alkali metal or ammonium salt of straight-chain aliphatic alcohol sulfuric acid ester, branched-chain aliphatic alcohol sulfuric acid ester, alkyl polyether sulfuric acid ester, alkyl-aryl polyether sulfuric acid ester, fatty oils sulfuric acid ester, olefins sulfuric acid ester, fatty acid amide sulfuric acid ester, paraffin sulfonate, fatty acid amide sulfonate, alkylbenzene sulfonate, alkyldiphenylether sulfonate, dialkyl ester of succinic acid sulfonate, dialkyl ester of phthalic acid sulfonate, alkylaryl polyether sulfonate, and akylbenzimidazole sulfonate, and the formaldehyde condensation product of an alkali metal or ammonium salt of alkyl naphthalene sulfonate.

References Cited

UNITED STATES PATENTS 3,360,491  12/1967  Axon _____ 260—29.2
3,433,780   3/1969  Cekada _____ 260—29.2

JULIUS FROME, Primary Examiner

A. H. KOECKERT, Assistant Examiner

U.S. Cl. X.R.

260—18 S, 46.5 G